F. G. MERRIAM.
PIPE.
No. 169,565.
Patented Nov. 2, 1875.
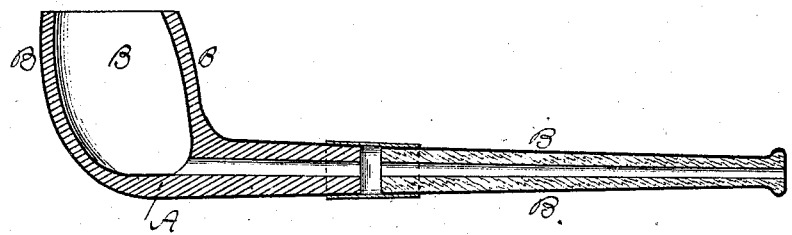
Attest:
Geo. H. Graham.
A. H. Norris
Inventor:
Flavel G. Merriam.
Per James L. Norris
Attorney.

UNITED STATES PATENT OFFICE.

FLAVEL G. MERRIAM, OF AKRON, OHIO.

IMPROVEMENT IN PIPES.

Specification forming part of Letters Patent No. 169,565, dated November 2, 1875; application filed August 7, 1875.

*To all whom it may concern:*

Be it known that I, FLAVEL G. MERRIAM, of Akron, in the county of Summit and State of Ohio, have invented certain new and useful Improvements in Tobacco-Pipes, of which the following is a specification:

This invention relates to certain improvements in the manufacture of tobacco-pipes, its object being to produce a cheap and durable pipe of greater durability than the ordinary clay or composition pipes, which are objectionable, not only on account of their extremely brittle character, but also because, after very little use, they become saturated with the essential oil of the tobacco and the products of the destructive distillation, and the condensable products of combustion of the same, which soon renders them nauseous and disagreeable to the taste, besides staining and injuring the appearance of the same. By my invention all these objections are obviated, and a cheap and durable pipe is produced.

My invention consists, essentially, in a new article of manufacture, formed by saturating the ordinary clay or composition pipes with enamel capable of withstanding the temperature of the burning tobacco, which fills the pores of the clay or other material, rendering the pipe impermeable to the essential oil and the condensable products of combustion, and giving a highly finished and handsome appearance to the outside of the pipe.

The drawing represents a sectional view of my improved pipe, in which the letter A represents the clay body, and B the enamel coating or covering of the same.

In carrying out my invention, I take the ordinary clay or composition pipes, and coat or saturate them with a certain enamel capable of withstanding the heat of the burning tobacco. I apply the enamel in successive applications on the outside and inside of the pipe, or on the outside alone, until the enamel thoroughly penetrates the pores of the clay or other similar substance, and it is then baked on after each successive coat, and is of sufficient thickness to impart the proper brilliancy and polish to the articles. The enamel is black, and will form a highly ornamental black surface upon the pipe, and render it similar in appearance to the expensive rubber pipes in the market, while, at the same time, the pipe will be entirely free from the objectionable odor of the same.

Various other colors may, however, be imparted by the use of differently-colored enamel, and the pipe be made to assume the appearance of the most beautiful meerschaum, or be colored in imitation of tortoise-shell, rosewood, briar-wood, and the other expensive woods commonly employed in the manufacture of pipes.

I find it most convenient to employ, in the manufacture of my improved pipes, the pipes in the market composed of a clay bowl and stem, or such that are composed wholly or partially of earthen material, enameling the whole, as above described.

Black enamel is prepared by boiling Naples asphaltum, fifty pounds, and dark gum-anime, eight pounds, in two gallons of linseed-oil, with a sufficient quantity of any suitable drier, until wholly dissolved, and the ingredients are uniformly incorporated, after which the mass is thinned down with thirty gallons of oil of turpentine.

The enamel is applied to the wooden pipes, stems, or bowls by immersing the same in the enamel until the pores are completely filled, and then baking at a high temperature. The enameled articles are then dipped in and again baked, and the process is continued until the desired finish and polish are obtained upon the surfaces.

The enamel is baked in the article at a temperature higher than that to which the pipe will ever be heated in smoking, forming an impervious filling for the pores of the article, which will prevent the essential oil of the tobacco from soaking into the pipe, and leave the pipe and stem in a condition to be readily and thoroughly cleaned whenever desired, besides giving a highly finished and ornamental appearance to the same.

Having thus described my invention, what I claim, and desire to secure by Letters Patent, is—

A pipe wholly or partially composed of clay, saturated with the enamel herein described, and baked after the application of the enamel, substantially as and for the purposes set forth.

In testimony that I claim the foregoing I have hereunto set my hand in the presence of the subscribing witnesses.

FLAVEL G. MERRIAM.

Witnesses:
 JOS. L. COOMBS,
 A. H. NORRIS.